United States Patent [19]

O'Connor

[11] Patent Number: 5,400,253

[45] Date of Patent: Mar. 21, 1995

[54] AUTOMATED STATISTICAL INVENTORY RECONCILATION SYSTEM FOR CONVENIENCE STORES AND AUTO/TRUCK SERVICE STATIONS

[75] Inventor: Paul M. O'Connor, Hoover, Ala.

[73] Assignee: Southern Power, Inc., Pelham, Ala.

[21] Appl. No.: 157,458

[22] Filed: Nov. 26, 1993

[51] Int. Cl.⁶ .......................... G06F 15/56; B67D 3/00
[52] U.S. Cl. ..................................... 364/442; 364/465; 364/479; 364/510
[58] Field of Search ........... 364/479, 465, 403, 571.04, 364/509, 510, 564, 442; 73/49.2, 292, 313; 222/14; 109/39; 340/612, 618

[56] References Cited

U.S. PATENT DOCUMENTS

| | | | |
|---|---|---|---|
| 4,247,899 | 1/1981 | Schiller et al. | 364/479 |
| 4,589,069 | 5/1986 | Endo et al. | 364/465 |
| 4,827,762 | 5/1989 | Hasselmann | 364/564 |
| 5,056,017 | 10/1991 | McGarvey | 364/403 |
| 5,249,129 | 9/1993 | Lamoureux et al. | 364/479 |
| 5,265,032 | 11/1993 | Patel | 364/509 |
| 5,270,943 | 12/1993 | Wam | 364/479 |

Primary Examiner—Kevin J. Teska
Assistant Examiner—Stephen J. Walder, Jr.
Attorney, Agent, or Firm—Veal & Marsh

[57] ABSTRACT

An automated system that constantly collects data from the tank monitor system, the fuel dispensing system and the point of sale equipment for the purpose of inventory reconciliation through statistical data analysis. The results of this data analysis is then transmitted by telephone means periodically to a central computer for further processing. This system will notify the central computer to indicate that a problem exists when any of the inventories have reached a minimum level or fail to reconcile due to unknown reasons. This system is designed to prevent loss of sales due to insufficient inventory and/or loss of inventory due to miscalibration of fuel dispensers, theft or tank leakage. This invention will interface with any equipment capable of serial communication and can be installed at existing service stations with a minimum amount of disruption to commerce.

12 Claims, 10 Drawing Sheets

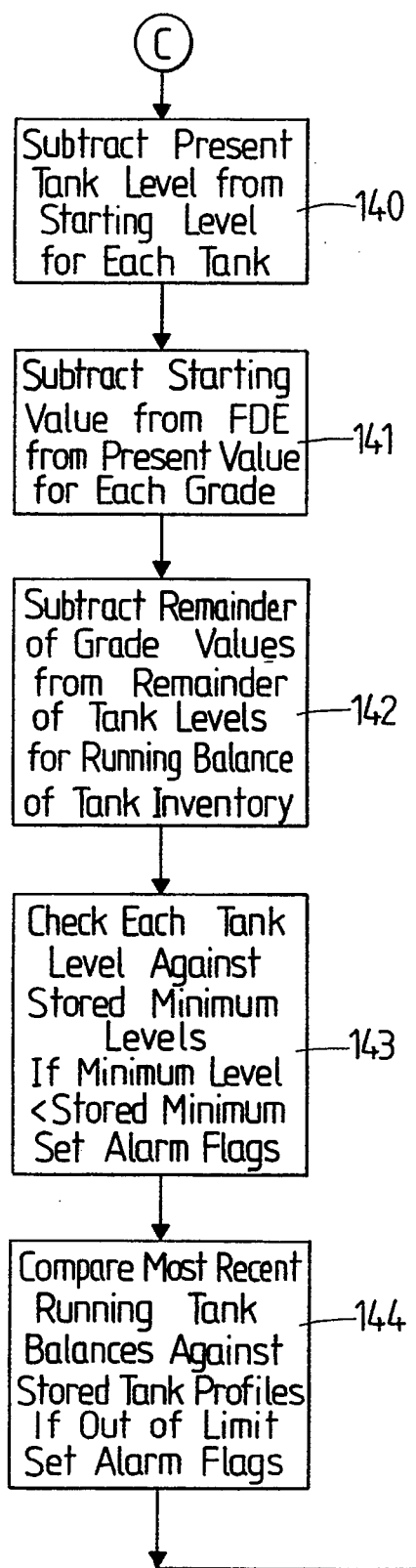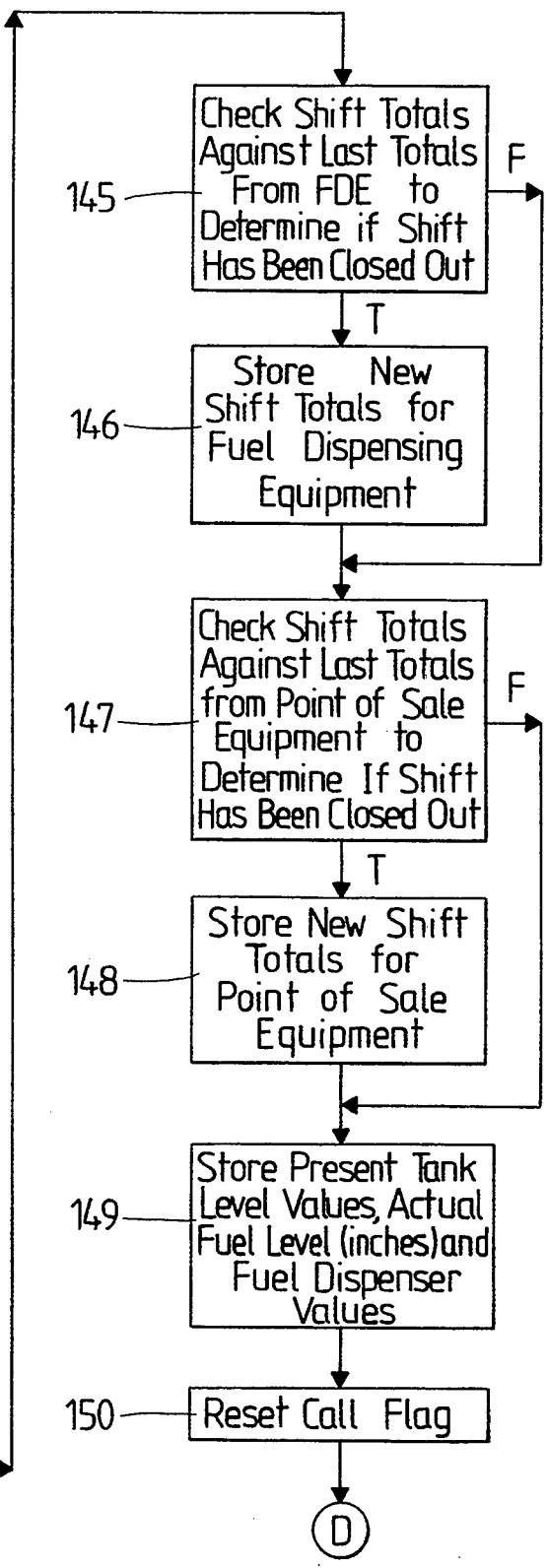
FIG. 5

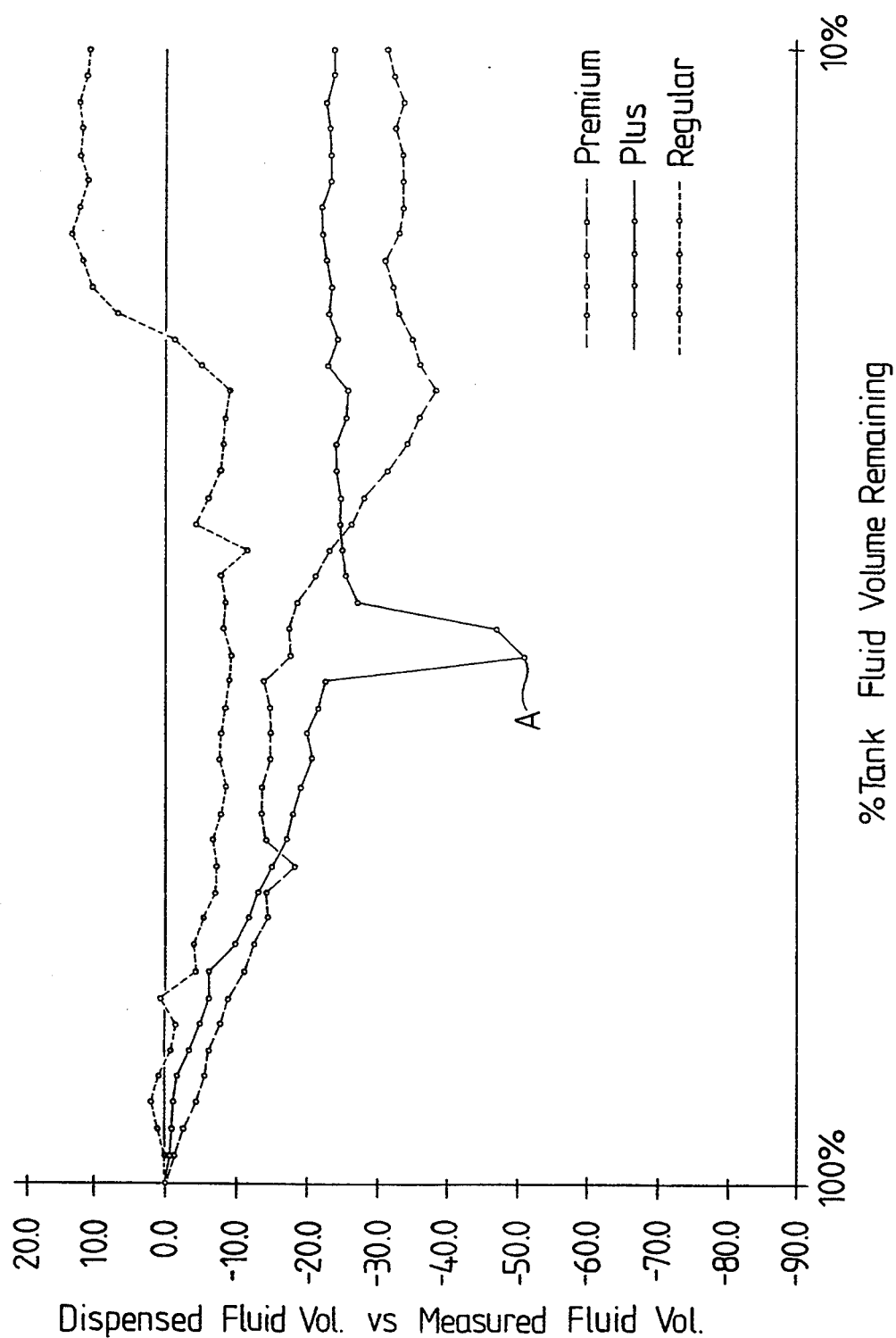

AUTOMATED STATISTICAL INVENTORY RECONCILATION SYSTEM FOR CONVENIENCE STORES AND AUTO/TRUCK SERVICE STATIONS

FIELD OF THE INVENTION

The present invention relates to methods for accurately monitoring inventory of liquids stored in large and oftentimes inaccessible storage tanks. More particularly the present invention relates to monitoring fuel storage tanks and providing an inventory tool therefor.

BACKGROUND OF THE INVENTION

This invention responds to the need for a better method of inventory reconciliation as related to the convenience store and auto/truck service station industry. An average store will pump in excess of 100,000 gallons per month and at today's prices losses can be considerable in a relatively short period of time. General accounting practices with their inherent time lags are not fast enough to identify these losses when they occur. This invention is designed to constantly reconcile these inventories and through statistical data analysis help uncover a loss before it becomes a problem.

The prior art discloses a means of detecting losses in fuel tanks which are frequently dispensed from, described in U.S. Pat. No. 5,056,017 issued to D. McGarvey on Oct. 8, 1991. The McGarvey system requires a considerable amount of hard wiring between each metering means and each tank level sensing means to a processor. Such an installation for an existing store would be cost prohibitive. The installation of a pulser means and a level sensor means within an area in which Class 1 liquids are dispensed and stored would further preclude the installation of such a system without the use of expensive intrinsically safe devices. The addition of such a pulser means to an already approved metering means would void the metering means listing with the approval authorities.

The accuracy of a modern tank monitor system, such as the Veeder Root Model TMS250 which utilize magnetostrictive technologies, addresses fuel tank inventory considerations not even considered in the acoustical level sensor means described in the McGarvey system. These considerations include tank tilt, fuel temperature coefficients, temperature gradients within the tank and water in the tank. Any of these considerations can render the results obtained through the McGarvey system inconclusive.

The implementation of the McGarvey system would be extremely difficult, if not impossible to implement on a practical scale.

SUMMARY OF THE INVENTION

This invention seeks to utilize systems already installed, listed and in use at existing convenience stores and service stations through the use of a serial interface means to obtain data peculiar to the storage facility in place. No approvals from authorities having jurisdiction will have to be obtained since all equipment is located outside of the Class 1 areas. This invention is by its very nature flexible enough to encompass new technologies in tank monitoring as they become available with only software changes.

It is an object of this invention to provide a workable, cost effective and affordable means for the store or station owner to reconcile his store's inventory automatically, in an accurate and timely fashion, and limit his losses in the event of a problem with said inventories.

It is an object of this invention to provide documentation for possible future Environmental Protection Agency requirements for continuous tank leak monitoring.

It is an object of this invention to interface with any fuel dispensing system and not only collect data concerning fuel quantities dispensed but the value of the fuel dispensed.

It is an object of this invention to enable the owner to recognize considerable savings by allowing him to maintain a "just in time" inventory management strategy.

Although this invention's primary object is to determine and identify fuel inventory problems, it also provides the store or station owner a means of collecting sales data in an automatic and accurate manner for any liquid commodity being sold.

An integral part of this invention is the central computer which gathers data from a plurality of convenience stores and service stations, and provides the owner with statistical data concerning any particular store's sales and inventory levels. Since most fuel deliveries are paid for at the time of delivery the owner can operate with less inventory, hence less of an investment.

The key to this invention's ability to monitor and reconcile the fuel inventory at a store or station is through the total system's ability to establish a trend for a given tank and then to monitor recurrent data from this tank to be sure that this trend is being adhered to. The best tank monitor system in use heretofore had to function as a product of calculations based upon the size of the tank and it's shape. The common steel tanks used at a majority of store and service stations are not all identical and can vary considerably due to manufacturing methods as well as installation conditions. The assumption that for each gallon pumped from a tank, the fuel tank measured inventory would drop a gallon, does not occur in the real world. This invention recognizes that any differences can be, through statistical data analysis, identified and stored as a normal tank performance curve.

BRIEF DESCRIPTION OF THE DRAWINGS

Apparatus embodying features of the present invention are depicted in the drawings which form a portion of this disclosure and wherein:

FIG. 5 is a function block diagram of an inventory reconciliation routine;

FIG. 10 is a depiction of the typical variance of tank balance over time for a 3 tank installation.

DETAILED DESCRIPTION OF A PREFERRED EMBODIMENT

Figure 1:
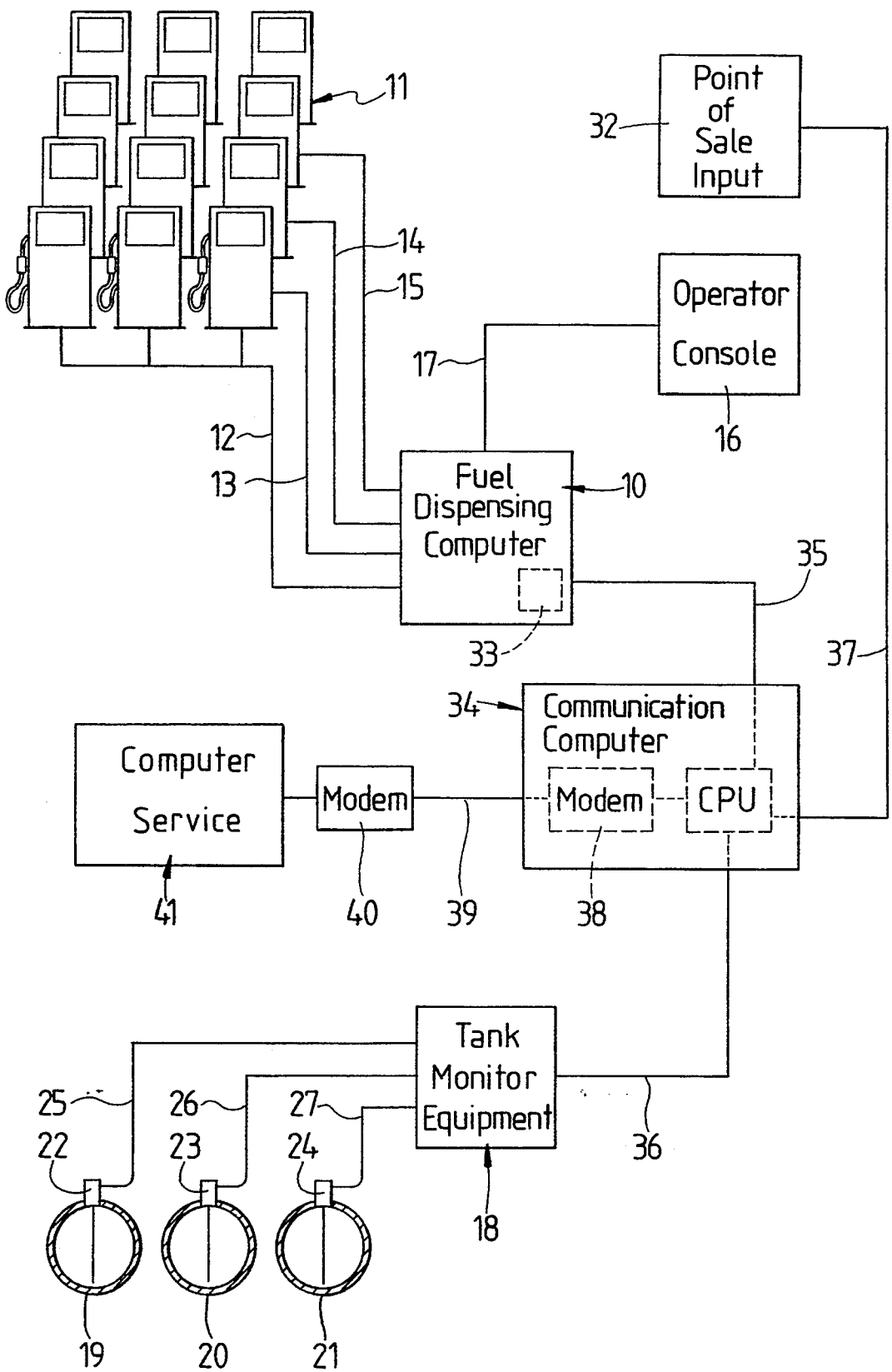
FIG. 1 is a block diagram of the total system showing all related equipment.

Referring to FIG. 1, in a typical installation, the liquid fuel dispensing equipment computer 10 is connected to a plurality of fuel dispensers 11 by means of communications and power supply cables, 12, 13, 14, and 15. This communication method uses a dedicated time-division multiplexed operation scheme. The fuel dispenser equipment operator's console 16 is located at a convenient location where customers can pay for the fuel. This console is connected to the fuel dispensing computer 10 by a multi-conductor cable 17. Depending upon the system used at a particular store or station, a special serial interface card 33, may have to be added in order to provide data access.

Figure 9:
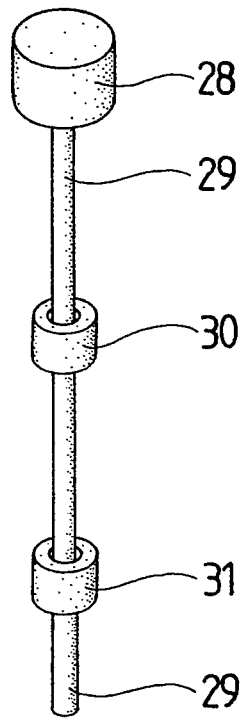
FIG. 9 is a drawing of a typical magnetostrictive tank probe.

The tank monitor equipment 18 monitors the fuel inventory stored in fuel storage tanks 19, 20 and 21 by means of a dedicated magnetostrictive tank probe 22, 23 and 24 mounted in each tank. Referring to FIG. 9, two floats 30 and 31 surround each of these probes. One float 30 only floats on the surface of the fuel in the tank and the other float 31 only floats on the interface of water and fuel. The probe's magnetostrictive amplifier 28 can differentiate each float's position with an accuracy of 0.025% of full scale. Each probe 29 has up to five internal RTD temperature sensors spaced equally through out its length to monitor the fuel temperature at various levels. Again referring to FIG. 1, the tank monitor equipment communicates with each probe by a two-wire cable 25, 26 and 27 which supplies both power and communications means. This is a depiction of a typical tank monitoring system as is well known in the art and used in most convenience stores and service stations.

The point of sale equipment 32 is a micro processor based cash register which is capable of serial communications. This point of sale equipment can be as simple or as sophisticated as the store owner's needs dictate. Current shift totals reflecting collateral sales can all be accessed through the serial port.

The heart of the system is the communication computer 34, which communicates with the fuel dispensing equipment 10, the tank monitor equipment 18 and the point of sale equipment 32 through serial communications cables 35, 36 and 37. This computer is totally software driven and can be changed to match any manufactured equipment which can be communicated with by serial means. This computer will periodically communicate with all of these pieces of equipment and will perform various mathematical calculations upon this data, and will save this data for transmission to the central computer 41. The communications computer will have as a part of its construction a telephone modem 38 to provide the means of communication with the central computer through ordinary telephone lines 39. The central computer will also have a telephone modem 40 where the modulated data signal from the remote computer will be demodulated.

The central computer 41 will periodically call a plurality of similar installation communication computers to complete this total system. By way of example, the communications computer located at each store or station will be leased by the owner and the central computer will be owned by a contracted service providing the owner with a myriad of data processing capabilities.

Figure 2:
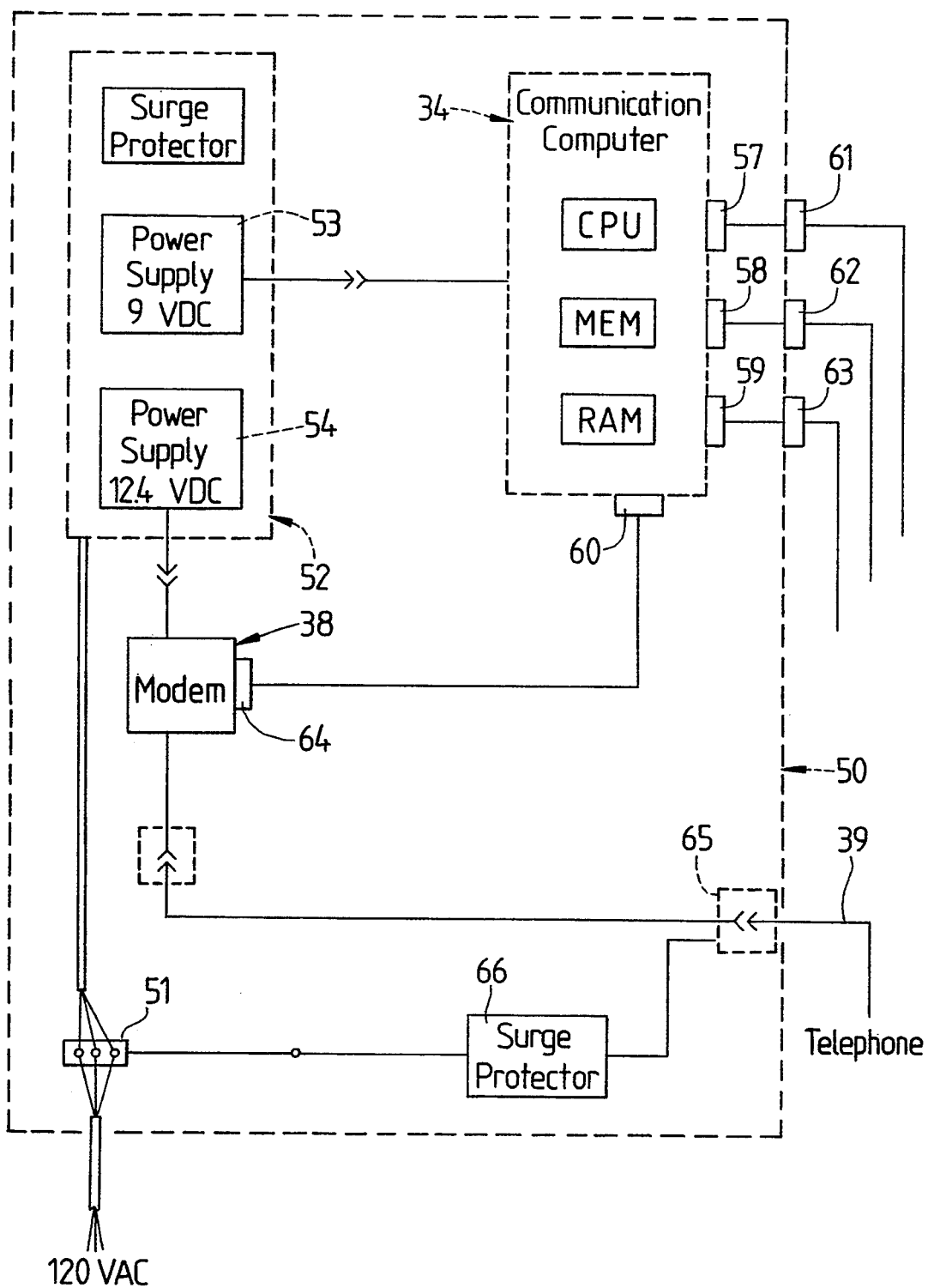
FIG. 2 is a block diagram of the components of the communications computer mounted in enclosure.

Referring to FIG. 2, the communications computer and associated hardware is mounted in a NEMA 1 enclosure 50 which will have a locking means on the door. A terminal strip 51 is provided so that 120 VAC supplied from the store or station's electrical system can be connected. A standard 120 VAC duplex receptacle 52 is mounted on the back panel which contains a surge protection device. This receptacle provides power and mounting means for two commercially available plug-in power supplies 53 and 54 for both the modem 38 and the communications computer 34. The power supply 53 for the communications computer 34 is a 9 VDC modular plug-in type unit. The power supply 54 for the modem 38 is a 12.4 VDC modular plug-in type unit.

The communications computer 34 has four serial communications ports 57, 58, 59 and 60 which connect to standard DB-25 connectors 61, 62 and 63 (mounted through the side of the enclosure for easy connection to the external equipment) and connector 64 which is connected to modem 38. Depending upon the external equipment's individual communication protocol, these ports can be either E.I.A. RS-485 Standard or RS-232.

Mounted on the back panel is a standard modular telephone jack 65. The purpose in using this type of modular telephone jack is two fold. It permits a means of connecting to a standard and readily available telephone modem and provides a terminal point for the telephone line to be connected to the system. Protection is also provided for the telephone system by use of a Type 144A surge protector 66 to limit possible damage to the store or station's equipment.

The modem 38 is a standard 2400 bps modem which connects to the telephone system through a RJ-11 modular jack and to the communications computer 34 through DB-25 connector 64.

Figure 3:
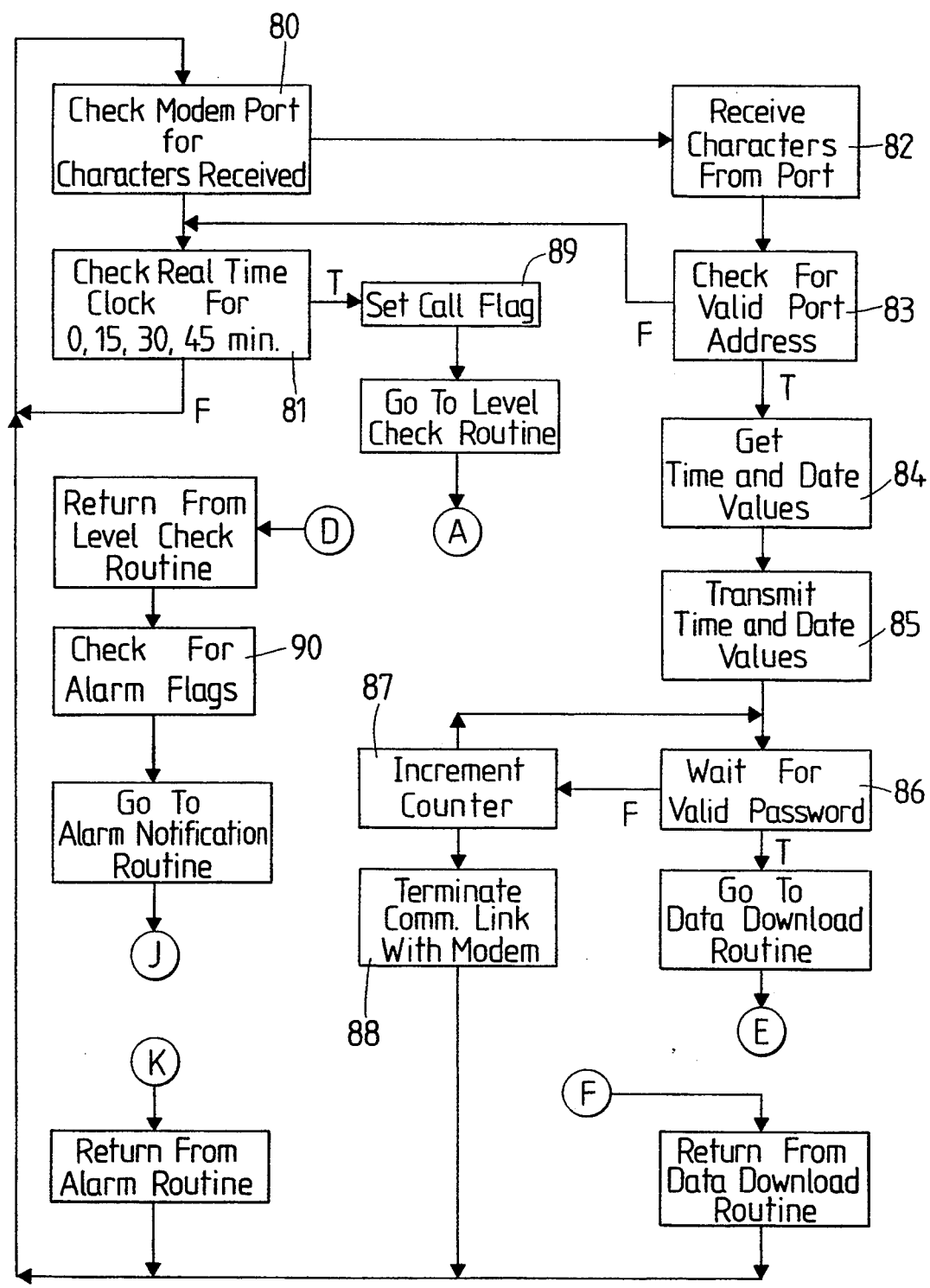
FIG. 3 is a function block diagram of a normal scan routine.

Referring to FIG. 3, the normal scan routine of the communications computer is depicted. The majority of the time the computer will be performing a monitoring function indicated by blocks 80 and 81. This function 80 checks the status of the communications buffer. When the carrier detected line has been pulled low by the modem, this indicates that a communications session is to be established with the central computer. The function indicated at block 81 checks a real time clock on board the communication computer to see when the minute register is equal to 0, 15, 30 or 45. This allows the computer to perform its communications routine every fifteen minutes. The communications routines can be set for any frequency, but 15 minute intervals are more than enough for good monitoring of the associated equipment.

When function 80 becomes true, the processor monitors the characters received via the modem and compares them with the stored port address number assigned to this particular location to verify that the central computer has the right location before communications are allowed to proceed as shown in block 83. If the comparison proves false, the routine is canceled and communication computer returns to its normal scan routine. If the comparison proves true, the function indicated at 84 retrieves the current time and date from the real time clock. This data is used for password protection. As indicated at block 85, the communication computer transmits the time and date values to the central computer and then awaits the proper password from the central computer as shown at 86. If the wrong password is received or the length of time that a reply takes exceeds a preindicated count by an internal counter as indicated at block 87, then the processor will return to its normal scan routine after terminating the communications session as shown at function 88. If the password received during the count is correct, the processor proceeds to the download routine depicted in FIG. 6. Upon returning from either the download routine or the command sequence routine, the processor resumes its normal scan routine.

Figure 4A:
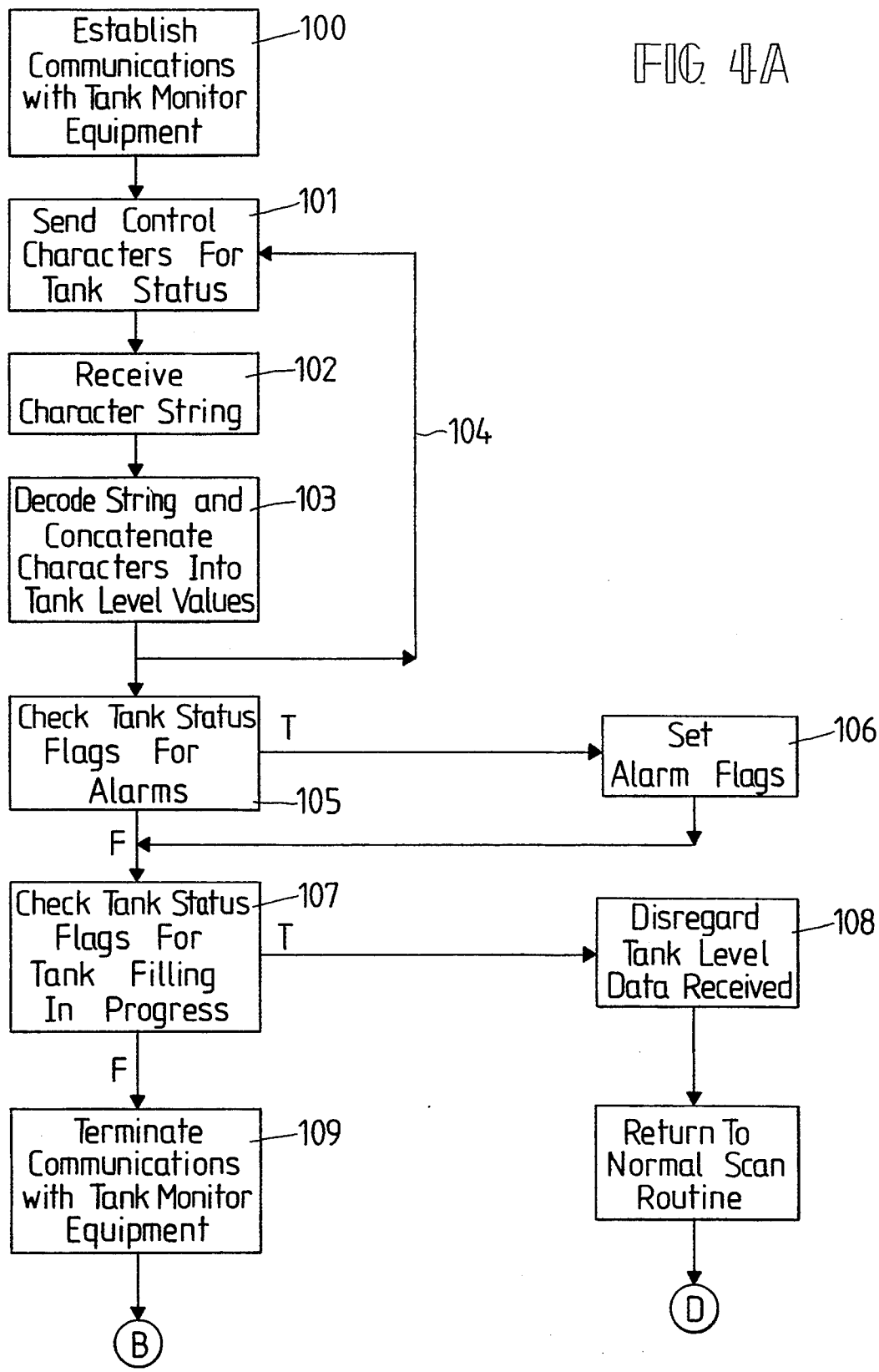
FIGS. 4A and 4B is a function block diagram of an inventory level check routine.
Figure 4B:
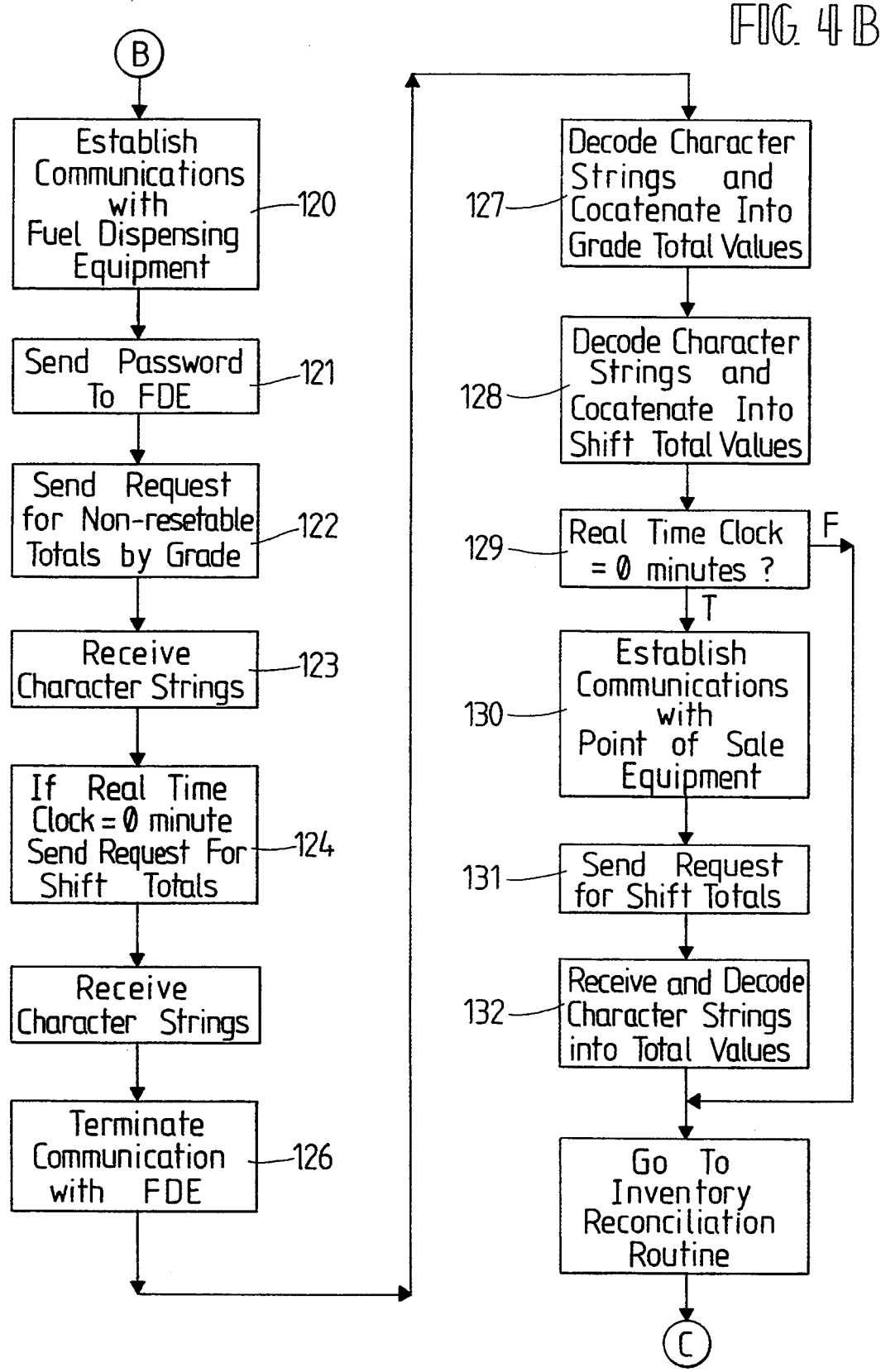

When the time data form the minute register becomes true as per block 81, a flag is set, indicated at block 89, that, when compared with the minute register will prevent the possibility of the processor from running more than one communications routine while the minute register remains equal to 0, 15, 30 or 45, as the case would be if the communications routine is cut short as it would during a refueling session. After the flag has been set, the processor then proceeds to the level checking routine as depicted in FIG. 4A and 4B and the inventory reconciliation routine displayed in FIG. 5. Upon returning from these routines, the processor performs function 90 in which it checks for any alarm flags that may have been set during the level check routine or the inventory reconciliation routine. If this check proves false, then the processor returns to its normal routine. If the check proves true, the processor proceeds to the alarm notification routine depicted in FIG. 7. Upon returning from the alarm notification routine, the processor returns to its normal scan routine.

Referring to FIG. 4A, in block 100 the communication computer establishes communications with the tank monitor equipment by first initializing the communication port. Function 101 depicts sending the proper control characters to which the tank monitor equipment replies with a stream of data which contains information such as the date, time, status, fuel quantity, fuel level, fuel temperature, ullage and water level in each tank. All of this data is contained in one data stream, and has to be decoded and concatenated into the proper tank level values for further processing. This is accomplished as depicted in block 103. This process has to be repeated as shown by 104, for each tank in use at the store or station. A check is made after all data has been decoded to check for any existing alarm flags, as depicted at block 105. If any alarms are present, an alarm flag is set according to its cause. Such alarms can occur if the fuel level drops below the preset low limit or the high limit. Further alarms can occur if the water level has exceeded its high limit or if the tank monitor has failed an automatic or manual leak detection cycle. The flags consist of a binary weighted number stored in a variable assigned for each tank. The process will use this flag at a later time in the program. During the process indicated at block 107, the computer checks the tank status flags which are also decoded during block 103 and looks for the status flag that denotes that a refueling session is in progress. If any of the tanks are in the process of being refueled, the data just received from the previous communications are considered to be inconclusive and must be disregarded as depicted in function 108. During refueling operations, the system will be returned to the normal scan function displayed in FIG. 3. If the tank's status proves true, then as indicated at block 109, the communication computer proceeds to terminate communications with the tank monitor equipment.

The processor or communication computer then proceeds to establish communication with the fuel dispensing equipment as depicted in FIG. 4b, as shown in block 120. This is accomplished by the initialization of the communication port. A password has to be sent to the fuel dispensing equipment as indicated in block 121, whereupon the fuel dispensing equipment responds with an acknowledgment. The processor then transmits the requests for all non-resetable fuel grade totals as indicated in block 122. The processor then receives the all character strings as shown by block 123. At block 124, a check of the real time clock is made to see if it equaled 0 at the time this inventory level check was initiated. If this check proves true, then another request is made for all shift totals from the fuel dispensing equipment. Block 126 indicates that communications with the fuel dispensing equipment is terminated.

As noted by block 127, the data received must be decoded since all data is transmitted in one stream. The decoding process also involves the concatenation of the data into grade totals. If shift totals were also requested, they will be processed as shown in block 128.

As indicated by block 129, another check is made to see if the minute register of the real time clock was equal to 0 at the time this present inventory level check was initiated. If the check proves false, functions indicated by 130, 131, and 132 are bypassed since this data need only be checked on an hourly basis. If the check proves true, then communications with the point of sale equipment is established in block 130. A request for shift totals is issued in block 131 and the data is received and processed in block 132.

Program flow then proceeds to FIG. 5 where the inventory reconciliation takes place. In block 140, the computer performs the subtraction of the present tank fuel level from the starting level which was established after the completion of a refueling session. This step is performed for each tank. Step 141 indicates performance of subtraction from the starting values for the fuel dispensing equipment derived after the completion of a refueling session. This step is also performed for each grade used in the system. Block 142 indicates performance of the subtraction of the remainders from steps 140 and 141 which yields the continuing balances of the inventory for each tank. As shown in block 143, the present tank levels are checked against stored low level for each tank to determine if fuel needs to be reordered. This level limit is not to be confused with the tank monitor limit alarm, but is a reorder limit. If any tank is below this limit, an alarm flag will be set.

The function depicted at 144 is perhaps the most important function to the entire invention. It is here that the individual tank balances are compared against the calculated tank levels and the stored values for previous tank runs to determine if the tank is within tolerance. With the methods employed with this invention, it is possible to have a tank that will show a negative balance through the upper half of the tank and show a positive balance during the bottom half of the tank and be perfectly in tolerance. Such would be the case for a tank probe that is not touching the bottom of the tank. FIG. 10 illustrates the tank monitor profiles for three tanks at the prototype test installation of this invention, as a function of deviation between calculated and dispensed fuel over the volume of the tank. As may be seen, the graph of the tank balances for the regular tank depicts a negative, positive transition in the balance.

A negative tank balance refers to a running balance that is a product of the fuel level in the tank dropping faster than the fuel is being dispensed. A positive tank balance refers to a running balance that is a product of the fuel level in a tank not dropping as fast as the fuel is being dispensed. A negative balance can indicate a fuel tank that is leaking, fuel dispensers out of calibration, a tank monitor system that has not been setup properly, a fuel probe not touching the bottom of the tank or a tank that is rolled. A positive balance can indicate fuel dispensers that are out of calibration, a tank monitor system that has not been setup correctly or fuel probe not touching the bottom of the tank.

These balances and their changes will react with regularity as long as the calculated tank levels are considered when analyzing this balance data. The most difficult problem to analyze is that of a fuel dispenser that is grossly out of calibration and does not see regular use. This invention can track the entire capacity of a tank from completely full to entirely empty. This capability far exceeds any calibration system employed by any regulatory agency during normal spot checks of the fuel dispensers. Industry-wide most calibrations of the fuel dispensers is accomplished with 5 gallon tanks. With this invention the overall calibration volume can be in excess of 8,000 gallons. As part of this invention's setup, the tank profile is not down loaded at the location until a minimum of three full cycles have been analyzed. Once this analysis has been completed and the data has been downloaded to the location as the paradigm profile for the location, it then becomes a totally automated system, with the determination of tank performances made at the location each time inventory level check is initiated.

If the stored tank profiles do not agree with the balances for the present calculated tank levels, then an alarm flag will be set indicating to the central computer that something is awry at the location. This is illustrated at A in FIG. 10, in that the tank balance is indicated as being grossly different from the norm.

In block 145, the computer checks the last shift totals obtained from the fuel dispensing equipment to determine if the shift has been closed out. This must be checked each cycle since there is no set time when this function is performed by the operators. If this check proves true and the close out has been accomplished, these new values will be stored into memory in block 146. If this check proves false, step 146 will be bypassed. In block 147, the computer checks the last shift totals against the present shift totals for the point of sale equipment to determine if the shift has been closed out. If this check proves true, then in step 148 the computer saves the latest shift totals to memory. If this check proves false, then step 148 is bypassed. In block 149, the computer performs the task of storing all data obtained from the previous calculations and communications to memory for later transmission to the central computer. In block 150, the computer resets the call flag that was set in step 89. This completes a full inventory level check and inventory reconciliation routine. The processor returns to the routines displayed in FIG. 3.

Figure 6:
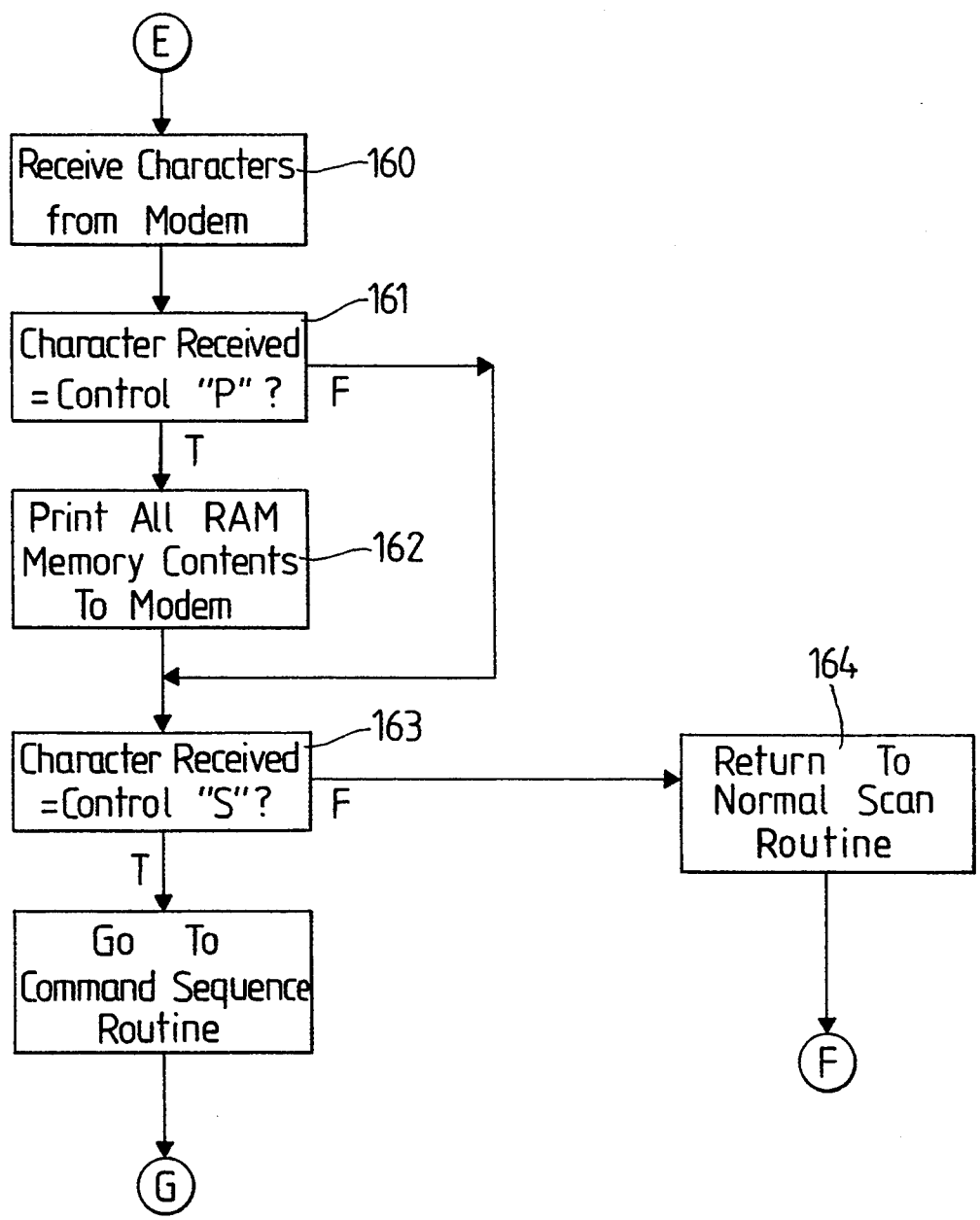
FIG. 6 is a function block diagram of a data down load routine.

Referring to FIG. 6, the data down load routine is illustrated. In block 160, the computer receives characters from the modem port. In block 161, the computer checks all characters received for a control P character. If this check proves true, then in block 162 the computer proceeds to transmit all stored data to the central computer in a format acceptable for data storage. If this check proves false, then step 162 is bypassed. If the character check in block 163 is a control S, then the processor proceeds to the steps illustrated in FIG. 8. If the check in step 163 proves false, then the processor returns to the normal scan routine displayed in FIG. 3.

Figure 7:
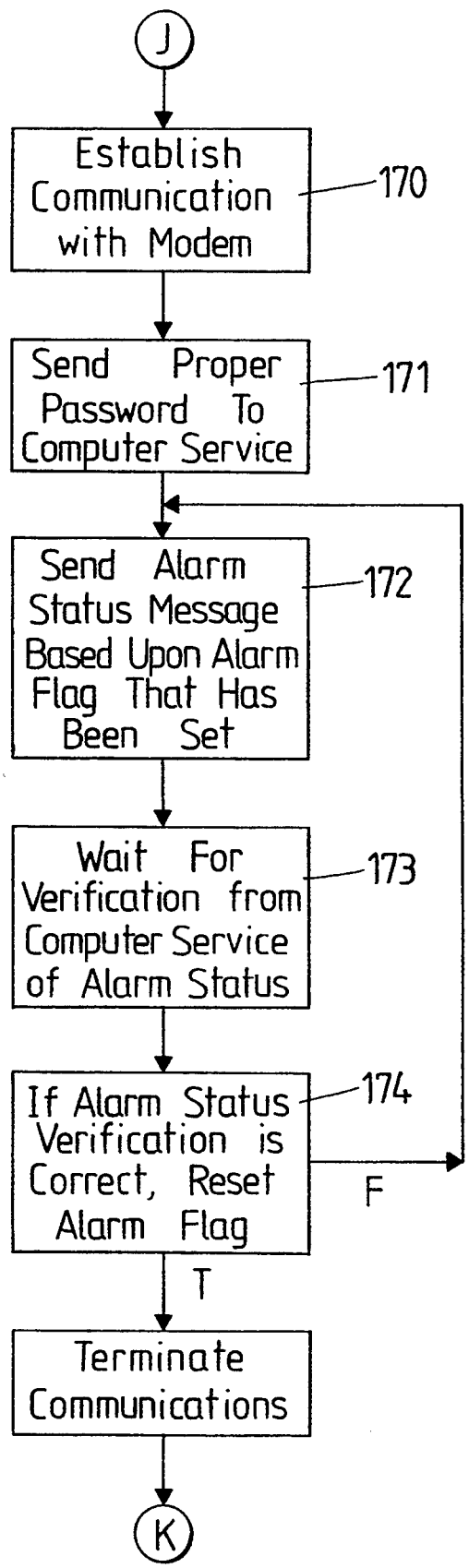
FIG. 7 is a function block diagram of an alarm notification routine.

Referring to FIG. 7, the alarm notification routine is illustrated. In block 170, the computer establishes communications with the modem which in turn dials the number of the central computer and, when a connection is established, sends the proper password in block 171. Upon acknowledgement from the computer service, in step 172 the computer then transmits the alarm status value. In block 173, then waits for verification from the computer service that it has received the alarm status value correctly by echoing the value back. In step 174, the computer checks that the verification is correct. If this verification proves false the alarm status value is sent again until it is correctly verified. When the verification proves true, the communication with the central computer is terminated and the processor returns to the normal scan routine illustrated in FIG. 3.

Figure 8:
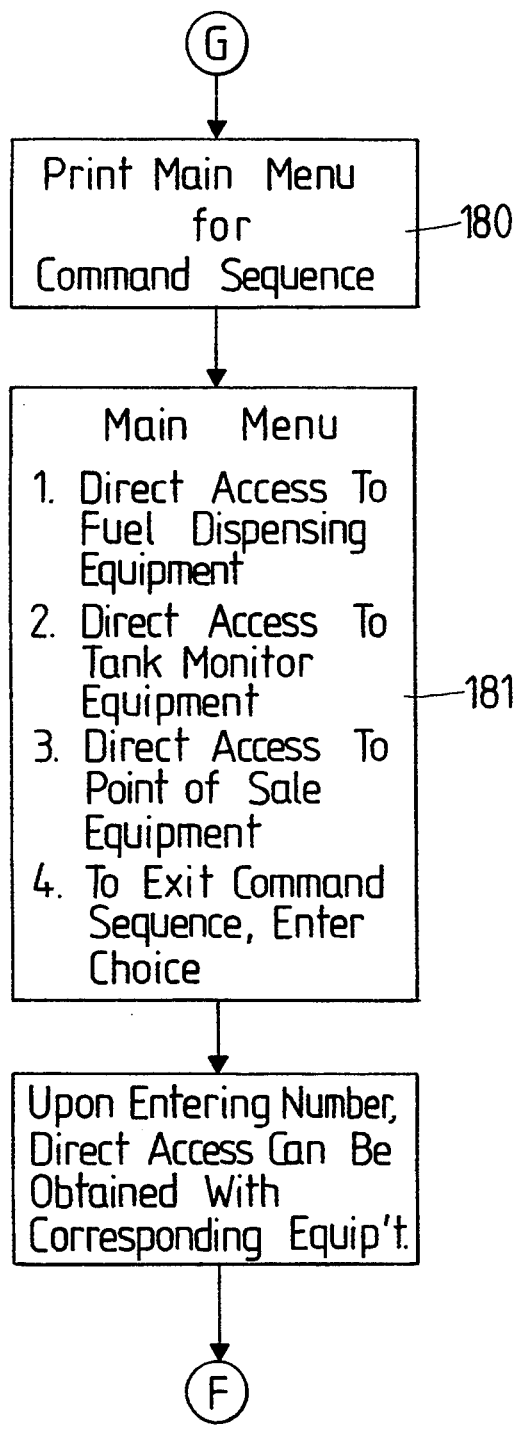
FIG. 8 is a function block diagram of a command sequence routine.

Referring to FIG. 8, the command sequence routine is illustrated. Since this routine is entered directly from the data download routine, a communication link has already been established with the central computer. This type of communication will only be established under human operator control from the central computer. In block 180, the central computer will print the menu displayed in step 181 to the screen of the operator's computer terminal. The operator can then access any of the equipment at the location directly for the purpose of maintenance, calibration or trouble shooting a problem. The communication computer becomes invisible to the operator during these communication sessions. It just passes characters between the modem port and the selected equipment.

It will become apparent to those skilled in the art that various modification to the preferred embodiments disclosed herein can be made without departing from the spirit or scope of the invention as defined by the appended claims.

While I have shown my invention in several forms, it will be obvious to those skilled in the art that it is not so limited but is susceptible of various changes and modifications without departing from the spirit thereof.

What I claim is:

1. Apparatus for statistical inventory reconciliation for use in conjunction with a plurality of liquid storage tanks, a plurality of liquid dispensing devices and a fuel dispensing computer receiving serial data input from each of said liquid dispensing devices, comprising in combination therewith:
   a) Means for discriminating between the levels of liquids of different densities within each of said plurality of liquid storage tanks having an electrical output signal associated therewith;
   b) Means for transferring selected data from said fuel dispensing computer via an electrical interface;
   c) Computer means for analyzing data including programmable means for comparing data received with predefined parameters to determine whether sensed liquid levels can be reconciled with dispensed liquid data, said programmable means programmed to determine a tank profile based on iterative comparisons of sensed liquid levels and dispensed liquid data over the entire volume of a tank, said computer means receiving input data signal from said discriminating means, and said fuel dispensing computer; and
   d) Means for remotely accessing said computer means to provide for routine monitoring or to respond to indication from said computer that data reconciliation is not possible.

2. Apparatus as defined in claim 1 wherein said discriminating device comprises a magneto restrictive tank probe mounted in each of said plurality of storage tanks said probe including a first float having a specific gravity less than a liquid fuel contained in said tank, a second float having a specific gravity greater than said liquid fuel and less than water such that said first and second floats are separated by the fuel contained in said tank, and a magnetostrictive amplifier which can differentiate each float's position.

3. Apparatus as defined in claim 1 wherein said means for remotely accessing comprises a central computer and telecommunication means for transmitting and receiving electronic signals between said central computer and said computer means.

4. Apparatus as defined in claim 3 wherein said computer means comprises a central processing unit, a memory unit, a random access memory unit, and at least three communication ports for transmitting and receiving electronic signals from said discriminating devices, said fuel dispensing computer, and said telecommunication means.

5. Apparatus as defined in claim 1 wherein said apparatus is used in conjunction with a point of sale device capable of retaining data relative to total sales of liquids, said apparatus further comprising means for transferring selected data from said point of sale device to said computer means via a second electrical interface.

6. A method for automated statistical inventory reconciliation for liquid fuel dispensing system comprising the steps of:
   a) Establishing an empirical correlation profile between actual fuel level profiles and calculated profiles for given fuel storage tanks by iteratively measuring the level of fuel in a given tank from a full tank condition to a minimum fuel condition, concurrently with monitoring the volume of fuel dispensed with said fuel dispensing devices, to establish a correlation profile between changes in the volume of fuel in the tank as calculated from said fuel levels and the volume of fuel in the tank as indicated by the difference in the full tank condition and the fuel dispensed by said fuel dispensing devices;
   b) Storing data relative to said correlation profile in a computer memory;
   c) Monitoring fuel levels in said fuel tanks and generating an output signal indicative thereof;
   d) Monitoring fuel dispensing devices to determine dispensed quantities and generating an output signal indicative thereof;
   e) Calculating a dynamic tank level from the input signals from said fuel levels;
   f) Calculating a dynamic fuel dispensed value from input signals from said fuel dispensing devices;
   g) Comparing said tank level and fuel dispensed value to said stored data relative to said correlation profile;
   h) Initiating a telecommunication data link to a remote computer responsive to an inconsistent comparison from the comparing step; and
   i) Providing a human sensible display of the results of said comparisons.

7. The method as defined in claim 6 further comprising monitoring point of sale equipment to determine the receipts relative to said dispensed quantities and generating an output signal indicative thereof.

8. The method as defined in claim 6 wherein said monitoring fuel levels step comprises placing a magnetostrictive probe in each tank to determine the level of the top and bottom of said fuel and outputting a signal indicative thereof.

9. The method as defined in claim 6 wherein said calculating dynamic tank balances from said fuel levels comprises:
   a) Storing in said computer memory existing tank levels of fluids, and actual fuel levels for each tank at selected times;
   b) Subtracting measured tank level and measured fuel level in inches at a defined time interval after said selected times; and
   c) Calculating a remaining fuel volume based on the difference in said measured and stored levels and the geometry of the tank.

10. The method as defined in claim 9 wherein said calculating a dynamic fuel dispensed value for said fuel dispensing devices comprises:
   a) Storing in said computer memory a value for the fuel dispensed at said selected times;
   b) Subtracting said stored value from the present value of fuel dispensed at said defined intervals after said selected times.

11. The method as defined in claim 6 wherein said calculating steps are performed iteratively at preset times, and data indicative of said calculation is stored in a computer memory in a communication computer for said given fuel storage tanks.

12. The method as defined in claim 11 wherein said remote computer initiates a communication link with said communication computer iteratively at predetermined times to review said calculated data.

* * * * *